Aug. 29, 1972 R. C. STANLEY ET AL 3,687,706
METHOD FOR COATING PIPE
Filed July 6, 1970
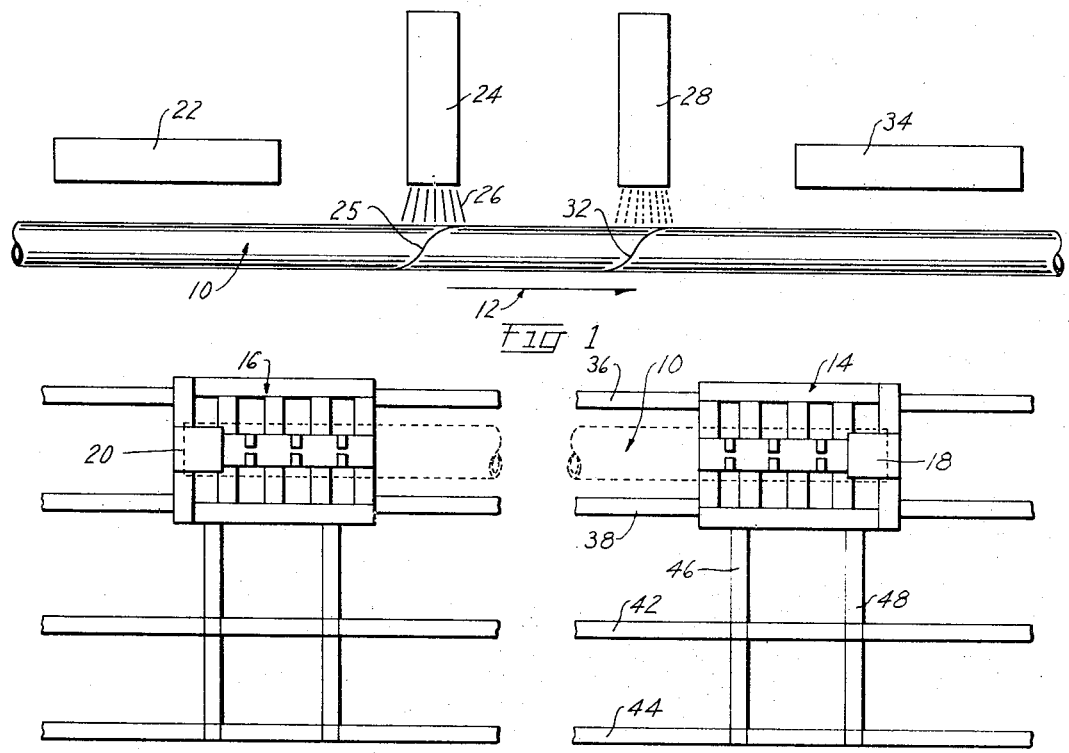
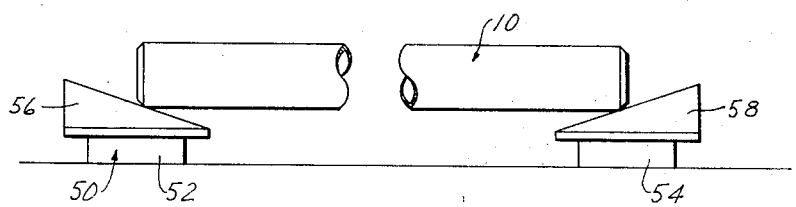
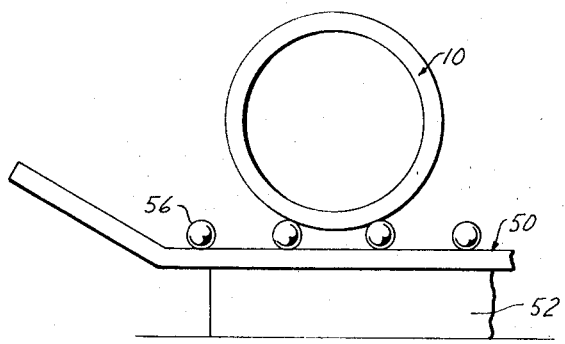
RICHARD C. STANLEY
CHARLES R. THATCHER
ERNEST C. POORE
    INVENTORS
BY William S. Dorman
ATTORNEY

United States Patent Office 3,687,706
Patented Aug. 29, 1972

3,687,706
METHOD FOR COATING PIPE
Richard C. Stanley, Charles R. Thatcher, and Ernest C. Poore, Tulsa, Okla., assignors to Midwestern Specialties, Ltd., Tulsa, Okla., a partnership composed of F. E. Stanley, R. C. Stanley, and C. C. Bledsoe
Continuation-in-part of application Ser. No. 752,240, Aug. 13, 1968. This application July 6, 1970, Ser. No. 52,638
Int. Cl. B05b 5/02; B44d 1/094
U.S. Cl. 117—18
4 Claims

ABSTRACT OF THE DISCLOSURE

A method of coating pipe, or other objects, which comprises cleaning the object to be coated, preheating the object, applying an initial wet barrier coating to the heated object, applying a second coating by spraying a powdered coating material onto the initially coated object, and post heating the coated pipe. The length of pipe, or the like, to be coated is moved through the various coating stages whereby the coating is applied in a continuous operation throughout the length of the pipe, and the completely coated pipe is removed from the coating area for storage, or the like. Alternatively, the first wet barrier coat may be omitted and in some instances the post heating may be eliminated.

---

This application is a continuation-in-part of application No. 752,240, filed Aug. 13, 1968 and entitled "Method for Coating Pipe." This invention relates to a method for processing pipes, cylindrical or tubular objects, and the like, and more particularly, but not by way of limitation, to a method for applying an external coating to large pipe sections. This application is an improvement over co-pending application Ser. No. 635,830 filed May 3, 1967, entitled "Method and Means for Coating Pipe," now abandoned and of which one of the present inventors is a co-inventor.

It is well known that the service life of steel or metallic pipes, whether disposed underground, or otherwise, is hampered or greatly lessened due to the elements surrounding the pipe. For example, the underground or buried metallic pipes are subject to a great amount of external corrosion which results from a natural flow of electric current caused by the reaction between the metal surfaces and chemicals in the soil or water surrounding the structure. The electric current will flow from the metal into the adjacent soil and back to the metal, thus making the metallic structure an anode at the point where the current leaves the metallic structure, and as the current flows from the pipe, minute particles of the metal are carried into the soil, thereby causing pitting of the pipe. This is commonly called electrolysis and over a period of time the pipe may become severely damaged and require replacement. This is particularly important with very large diameter pipe lines which are used for transparting natural gas at high pressure. Weakening of the pipe due to corrosion or other reasons can lead to explosions causing severe damage and occasional loss of life. There are several methods utilized today for reducing the damage due to corrosion or electrolysis, and one of the most common methods is to provide a direct current flow from an outside source in an opposite direction to the flow of current from the pipe to render the structure cathodic instead of anodic (called cathodic protection) thus substantially precluding loss of minute metallic particles from the pipe. Another method consists of burying magnesium or other metallic anodes adjacent the structure to be protected, with the structure and anode being metallically connected to produce a galvanic cell to eliminate corrosion.

External coating of a pipe is also utilized for protection thereof, both is buried structures and in those structures disposed above the ground, and is considered to be advantageous for several reasons. The coating may provide a more universal protection for the pipe, and provide a more lasting protection therefor in a more economical manner. However, many of the coatings presently available for the exteriors of pipes have certain disadvantages in that the comparatively rough handling of the pipe during installation, and the like, frequently chips the coating or breaks the coating, and as a result deterioration of the metal can result. Common practice is to both coat the pipe and to protect the pipe cathodically. Cathodic protection, however, frequently causes the coating to fall. Consequently, there has been great study and effort put forth in the development of coating for pipe, and particularly plastic coatings, which will overcome these disadvantages. For example, one such coating known under the trade name Nap-Gard has been developed by Napko Corporation which has proven to be extremely efficient and desirable for the exterior coating of pipes, the coating material being tough and showing great resistance to deterioration under cathodic protection. Nap-Gard is a high molecular weight cross linked polymer whose basic polymeric structure consists of linearized phenolic type units, further described in the Napko Coating Division publication SA–258 dated April 1967. This particular plastic coating requires the application of two coats of material. Whereas methods of applying the two coatings and subsequent operations to relatively small pipe sections (that is pipe sections of relatively small diameters such as two to twelve inches, and relatively small lengths) have been developed which are considered to be economically feasible, there has been no practical method of applying the coatings to the exterior of very large pipe sections.

The coating method and means of the aforementioned co-pending application Ser. No. 635,830 was developed to provide an efficient and economically feasible coating for large pipe sections, and does indeed solve the problem. However, in working with the method and means set forth herein, a method has been discovered for the coating of extremely large pipe sections in an even more facile and economical manner. For example, pipe sections having a diameter of approximately twenty inches to sixty-four inches and weighing up to twenty tons, and lengths varying from approximately fifteen feet to eighty feet, may be efficiently coated in a manner wherein the expense is reduced to a minimum, or at least maintained within a practical economic range, and the resulting coating of the pipe is of an extremely high quality. Each pipe section to be coated is initially supported at the opposite ends thereof with the central portion being suspended therebetween. The supporting members are preferably wheeled carriers mounted on a track for movement therealong for transporting the pipe sections through the areas wherein the various steps of the coating process are performed. The pipe section is supported on the carriers in such a manner that the pipe section is constantly rotated as the carriers move along the track, thus assuring an efficient coating of the entire outer periphery of the pipe sections due to the overlapping helical spray pattern thus achieved. This unique method of applying the coating material results in the coating being applied in a uniform helical pattern around the pipe. Other methods in use today, such as that shown in the M. R. Miller Pat. No. 2,781,279 issued Feb. 12, 1957, and entitled "Method and Apparatus for Spray Coating of Articles," and the M. R. Miller Pat. No. 2,777,784, issued Jan. 15, 1957, and entitled "Method and Apparatus for Spray Coating of Articles," arranged fixed guns around fixed pipe to obtain a helical pattern. This, should one or more guns fail, results in thin or bare areas of coating running longitudinally the whole length of the pipe. The present method precludes any possibility of a longitudinally extending thin section of coating and produces fully uniform coating by adjusting the speed of longitudinal travel of the coating apparatus and the rotational rate of speed of the pipe such that consecutive layers of coating deposited by each and every gun overlap many times, thus failure of one, or even more guns is unimportant.

The length of pipe to be coated is initially cleaned, and is then moved into and through a preheat stage to raise the temperature thereof to the proper degree, but not exceeding 500° F. The pipe section then moves through a first coating stage wherein the first thermosetting plastic material is sprayed or otherwise applied to the outer periphery of the pipe. The first thermosetting plastic material is in a solution and provides a wet barrier coating for the pipe when applied. The heat in the pipe evaporates the solvent and converts the wet coating into a semi-solid state. The initially coated pipe is then moved toward a second coating stage. However, during processing the pipe cools slightly prior to the application of a second coating. Subsequent to the slight temperature drop of the initially coated pipe, a second coating of a dry powder is then applied. This is preferably accomplished through an electrostatic spraying of the dry powder onto the outer periphery of the pipe. Of course, the pipe travels in a longitudinal direction and simultaneously rotates about the longitudinal axis thereof, thus resulting in a helical spray pattern as hereinbefore set forth. This assures an efficient and thorough covering of the exterior surface or outer periphery of the pipe and results in coatings of from five to twenty-five mils in total film thickness. The coated pipe is then moved through a post heating stage, and is then deposited in a storage area, or the like.

It is an important object of this invention to provide a novel method for efficiently and economically coating the exterior of extremely large pipe sections.

Another object of this invention is to provide a novel method for coating the exterior of extremely large pipe sections wherein the pipe section is moved continually through the various stages of the coating operation for assuring an efficient and thorough coating thereof.

A further object of this invention is to provide a novel method for coating the exterior of very large diameter pipe or cylindrical objects wherein the coating material may be applied evenly and in an uninterrupted path through the entire length of the pipe.

It is still a further object of this invention to provide a novel method for coating the exterior of extremely large pipe sections wherein the coating is applied in multiple layers with an efficient control of the temperature of the pipe section in proper association with each of the individual coating operations.

A still further object of this invention is to provide a novel method for coating the exterior of extremely large pipe sections which is simple and efficient in application and durable in use.

Other and further objects and advantageous features of the present invention will hereinafter more fully appear in connection with a detailed description of the drawings in which:

FIG. 1 is a side elevational schematic view depicting the overall coating method.

FIG. 2 is a schematic plan view generally depicting a carrier track means such as may be utilized in the invention, with the pipe shown in dotted lines.

FIG. 3 is a side elevational schematic view showing a saddle member such as utilized in the invention and having a coated pipe section thereon for delivery thereof to storage.

FIG. 4 is an end elevational schematic view of the saddle member and pipe shown in FIG. 3.

Referring to the drawings in detail, reference character 10 generally indicates a relatively large and lengthy pipe section being moved in a direction of travel indicated by the arrow 12 for receiving a coating on the outer periphery thereof. The opposite ends of the pipe 10 are disposed on spaced substantially identical movable carrier members, generally indicated at 14 and 16 in FIG. 2, and supported thereon by pipe end support members 18 and 20, respectively, whereby the pipe 10 may be rotated about the longitudinal axis thereof simultaneously with the longitudinal movement thereof in the direction indicated by the arrow 12 during the coating operation. The pipe end support members 18 and 20 are preferably substantially circular plug members generally similar to that disclosed in co-pending application No. 635,830, and are rotatably secured to the respective carriers 14 and 16 in any suitable manner (not shown) and each plug 18 and 20 is adapted for insertion within the open ends of the pipe 10 for supporting thereof in a manner whereby the coated outer periphery of the pipe is not engaged. In addition, the plugs 18 and 20 may be provided with suitable rollers (not shown) for facilitating insertion thereof within the pipe ends.

The outer periphery of the pipe 10 is initially thoroughly cleaned by any of the several well known processes, such as use of an abrasive, or the like, in order to prepare the pipe for receiving the coating material. The pipe may be either cleaned while being supported by the carrier members 14 and 16 and prior to the coating operation, or may be cleaned at a remote position with respect to the carriers 14 and 16 and transferred to the carriers subsequent to the cleaning operation, as desired, and as will be more fully set forth hereinafter. The cleaned pipe is then moved through a preheating stage as indicated at 22 in FIG. 1. It is to be understood, however, that the pipe may be previously heated at a station remote from the carriers 14 and 16 and picked up hot. As the pipe travels through the preheating stage, the temperature of the pipe is raised to that considered to be the most desirable for the efficient application of the first layer of coating material of the Nap-Gard plastic coating hereinbefore mentioned, but care is taken that the temperature of the pipe does not exceed 500° F. to preclude damage to the pipe. Any suitable type of heater device may be utilized. Of course, the speed of travel of the pipe through the heating area or stage 22 may be established at the most desirable for providing the desired rise or elevation of temperature for the surface of the pipe 10 which is to be coated.

As the properly heated pipe 10 leaves the heating area 22, it is moved into the proximity of a spray apparatus 24 wherein the first layer of coating material is progressively applied to the outer periphery of the traveling pipe, as generally indicated by the barrier coating line 25. The first coating material is a thermosetting plastic material in a solution, and provides a wet barrier layer on the pipe. The heat in the pipe evaporates the solvent and converts the wet coating into a semi-solid state. The spraying apparatus 24 may be of any suitable or well known type, such as that generally disclosed in the aforesaid co-pending application No. 635,830, although it is preferable in the present instance to utilize a stationary type spraying device rather than a moving type spray device. The apparatus 24 is preferably provided with a plurality of spray nozzles, spray guns, or the like (not shown) which direct jets 26 of the first coating material in a direction toward the pipe disposed in the proximity thereof. As hereinbefore set forth, it is preferable that the pipe section 10 be rotated simultaneously with the longitudinal movement thereof whereby the wet barrier layer is applied in an overlapping helical spray pattern, thus assuring an efficient and thorough covering of the pipe with the substantial elimination of "holidays," or thin or bare areas as hereinbefore set forth.

Whereas the pipe section 10 is preferably moved directly from the barrier spray area 24 to the second coating spray area 28, it is to be noted that a slight temperature drop may occur due to natural cooling. The initially coated pipe is moved into the second coating stage or area 28 where the second layer of coating is applied to the outer periphery of the pipe. The second coating material is preferably in the form of a dry powder and is preferably electrostatically sprayed in an overlapping helical spray pattern on the pipe. Of course, there is no intention of limiting the second coating material to a powder since it may be in the form of a liquid, or the like. The second layer of coating material is progressively applied to the longitudinally moving pipe, as indicated by the coating line 32.

The pipe section 10 then moves into and through a post heating stage indicated at 34 where the pipe is moved in the proximity of a suitable heater, or suitable ovens, and the pipe is sufficiently heated for curing or drying both layers of coating material, while taking care that the pipe is not heated to a temperature higher than 500° F. Subsequent to the post heating stage, the coated pipe section may be removed or transferred to a storage area, or the like. Of course, the coated pipe may be cooled in any well known manner subsequent to the post heating operation for facilitating handling thereof.

Referring to FIG. 2, the carrier members 14 and 16 are mounted on a pair of spaced parallel track members 36 and 38 which extend through the entire area of the coating operation and in a direction substantially parallel with the direction of travel indicated by the arrow 12 in FIG. 1. The carrier members are adapted for movement along the tracks 36 and 38 in any well known manner for progressively moving the pipe section 10 through the coating operation. As hereinbefore set forth, the pipe support members 18 and 20 are each preferably rotatably secured to the respective carriers 14 and 16 and support the pipe ends in a manner for transmitting rotation to the pipe section 10 about the longitudinal axis thereof. The plug or support members 18 and 20 may be of any suitable or well known construction.

Furthermore, the carriers 14 and 16 may be provided with wheels, or the like (not shown), whereby each carrier may be moved in a direction substantially perpendicular with respect to the direction of travel for the pipe during the coating operation. This is for facilitating returning of the carriers to the initial position therefor subsequent to completion of coating one pipe section whereby the carriers may be loaded with another pipe section for the coating operation. As schematically shown in FIG. 2, a second pair of rails 42 and 44, similar to the rails 36 and 38 are spaced from the rails 36 and 38, and extend substantially parallel thereto. A plurality of perpendicularly arranged sets or pairs of tracks or rails 46 and 48 provide communication between the sets of rails 36 and 38 and the rails 42 and 44. The sets or pairs of tracks 42 and 44 may be spaced throughout the length of the mutually parallel rails 36, 38, 42 and 44 in order to facilitate manipulation of the pipe section 10 by the carriers 14 and 16.

For example, the cleaned pipe sections may be stored in a remote area from the coating operation, and may be mounted on the carriers 14 and 16 from a position in the proximity of the left hand end of the rails 36 and 38 as viewed in FIG. 2. The pipe section is then moved along the rails 36 and 38 by the carriers 14 and 16 whereby the pipe may be coated as hereinbefore set forth. When the pipe has been completely coated and has completed the post heat operation, the coated pipe section may be removed from the carriers at the right hand end of the rails 36 and 38 as viewed in FIG. 2 and the carriers 14 and 16 may be transferred to the rails 42 and 44 by moving across additional complementary pairs of tracks 46 and 48.

The coated pipe is transferred from the carriers 14 and 16 at the right hand end of the rails 36 and 38 as viewed in FIG. 2 by a specially designed saddle structure generally indicated at 50 in FIGS. 3 and 4. The saddle structure 50 comprises a pair of substantially identical spaced support members 52 and 54 disposed in the proximity of the rail 36 and preferably substantially parallel with respect thereto. A plurality of spaced rollers 56 and 58 are journalled on the supports 52 and 54, respectively, and may be in the form of tapered rollers or straight rollers arranged for engaging the outer periphery of the opposite ends of the pipe 10 at the bevel only, as illustrated in FIG. 3. If desired, a tapered ramp may be utilized in lieu of the rollers 56 and 58 and so arranged as to receive the bevelled ends of the pipe 10 thereon whereby the pipe may roll along the ramp by gravity to a storage area, or the like (not shown).

Of course, the carrier members 14 and 16 may be of any suitable or well known structure, and may be powered in any suitable or well known manner for moving the pipe sections 10 through the coating operation. In addition, not only is each pipe section coated in a progressive coating operation, but also each succeeding pipe section 10 may enter the preheating area 22 as soon as the preceding pipe section has cleared the preheating area 22. Thus, many pipe sections may be coated in a relatively short time, thus greatly reducing the overall expense of the coating operation. In addition, the special saddle means 50 provided for receiving the coated pipe sections from the carriers 14 and 16 is particularly designed for engaging only the bevelled ends of the coated pipe section thus precluding any engagement of the coated pipe surface during handling of the pipe and moving of the pipe to the storage area.

In a single layer coating operation, as opposed to a multiple layer coating operation, the coating material may be either "wet" or "dry" as desired. The object to be coated may be initially heated and then the coating material applied to the heated object, followed by a post heating operation. Alternatively, the coating may be applied to the heated object with the post heating operation being omitted.

From the foregoing it will be apparent that the present invention provides a novel method of coating the exterior of extremely large pipe sections. The coating is applied in two separate layers, with at least one heating operation in association with the coating operation. The pipe is heated preceding the application of the first wet barrier coat, and heated again subsequent to the application of the second layer of coating material. The pipe section is moved progressively through the coating procedure and is provided with a thorough coating in multiple layers of overlapping helical spray patterns whereby holidays, thin or bare areas, and the like, are substantially eliminated. The first coating is preferably a liquid material and the second coating is preferably a dry or powdered material such as that required or desired to provide the Nap-Gard coating for the exterior of the pipe. The novel method is simple and economical in operation and efficient and desirable in use.

Whereas the present invention has been described in particular relation to the drawings attached hereto, it should be understood that other and further modifications, apart from those shown or suggested herein, may be made within the spirit and scope of this invention.

What is claimed is:

1. A method of coating the exterior of an extremely large diameter pipe having a diameter exceeding approximately twenty inches and a length exceeding approximately fifteen feet with a multiple layered coating which includes the steps of preheating the pipe, continuously moving the pipe in a longitudinal direction, inserting plugs into the open opposite ends of the pipe in such manner that said plugs engage only the interiors of said opposite ends while simultaneously supporting the pipe during the longitudinal movement thereof, rotating said pipe continuously about the horizontal axis thereof during the longitudinal movement thereof by rotating said plugs, applying an initial layer of coating material on the pipe while the pipe is continuously rotated and continuously moved in a longitudinal direction, applying a second layer of coating material on the pipe while the pipe is continuously rotated and moved continuously in a longitudinal direction, and heating the coated pipe for drying and curing of the coating material subsequent to the application of the second layer of coating material.

2. A method of coating the exterior of an extremely large diameter pipe as set forth in claim 1 wherein the initial layer of coating material is applied in solution, and the second layer of coating material is applied as a dry thermosetting powder.

3. A method of coating the exterior of an extremely large diameter pipe as set forth in claim 2 wherein each of said layers of coating material is applied in a helical spray pattern.

4. A method of coating the exterior of extremely large diameter pipe having a diameter exceeding approximately twenty inches and a length exceeding approximately fifteen feet with a multiple layered coating which includes the steps of continuously moving the pipe in a longitudinal direction, inserting plugs into the open opposite ends of the pipe in such a manner that the plugs engage only the interiors of the said opposite ends while simultaneously supporting the pipe during the longitudinal movement thereof, rotating said pipe about the longitudinal axis thereof during the longitudinal movement of said pipe by rotating said plugs, initially heating the exterior of the pipe, applying an initial layer of the coating material to the exterior layer of the pipe in a solution while the pipe is continuously rotated and continuously moved in a longitudinal direction, applying a second coating of material to the exterior of the pipe in the form of a dry powder while the pipe is continuously rotated and continuously moved in a longitudinal direction, and heating the coated pipe for curing of both layers of coating material, all of said coating steps being performed progressively on the leading portion of the moving pipe while the trailing portion of the pipe is being similarly coated.

References Cited

UNITED STATES PATENTS

| | | | |
|---|---|---|---|
| 3,294,573 | 12/1966 | Michael et al. | 117—94 |
| 3,348,995 | 10/1967 | Baker et al. | 117—94 X |
| 2,842,272 | 7/1958 | Folks | 214—1 |
| 2,279,340 | 4/1942 | Postlewaite | 214—1 X |
| 3,248,253 | 4/1966 | Barford et al. | 117—17 |
| 3,513,012 | 5/1970 | Point | 117—17 |
| 3,155,545 | 11/1964 | Rocks et al. | 117—119.2 X |
| 3,108,022 | 10/1963 | Church | 117—21 |
| 3,161,530 | 12/1964 | Strobel | 117—21 |
| 3,208,868 | 9/1965 | Strobel et al. | 117—21 |
| 3,389,009 | 6/1968 | McNulty et al. | 117—94 |
| 3,443,984 | 5/1969 | Stewart | 117—94 |
| 3,208,869 | 9/1965 | Starr et al. | 117—18 |
| 2,497,696 | 2/1950 | Smith | 117—18 |
| 2,777,784 | 1/1957 | Miller | 117—94 |
| 2,781,279 | 2/1957 | Miller | 117—94 |
| 2,789,075 | 4/1957 | Stahl | 117—17 |
| 2,963,045 | 12/1960 | Canevari et al. | 117—94 |
| 3,008,848 | 11/1961 | Annonio | 117—DIG 6 |
| 3,034,926 | 5/962 | Carter et al. | 18—44 |
| 3,058,443 | 10/1962 | Paton | 117—23 |
| 3,140,195 | 7/1964 | Nagel | 117—29 |
| 3,148,077 | 8/1964 | Garetto | 117—21 |
| 3,207,358 | 9/1965 | Fliss | 117—21 |
| 2,834,455 | 5/1958 | Marantz | 214—1 X |
| 3,581,922 | 6/1971 | Versoy et al. | 118—320 |

WILLIAM D. MARTIN, Primary Examiner

M. SOFOCLEOUS, Assistant Examiner

U.S. Cl. X.R.

117—20, 21, 16, 93.4 R, 93.43, 94, 105.4; 118—621, 630, 308, 320, 641, DIG. 11